United States Patent [19]

Ueno et al.

[11] 4,369,656
[45] Jan. 25, 1983

[54] AIR INTAKE MEASURING DEVICE FOR INTERNAL COMBUSTION ENGINE

[75] Inventors: Sadayasu Ueno; Kanemasa Sato; Yoshishige Oyama; Yutaka Nishimura; Kazuhiko Miya, all of Katsuta, Japan

[73] Assignee: Hitachi, Ltd., Tokyo, Japan

[21] Appl. No.: 230,804

[22] Filed: Feb. 2, 1981

[30] Foreign Application Priority Data

Jan. 31, 1980 [JP] Japan ................................. 55/11344

[51] Int. Cl.³ .................................................. G01F 1/68
[52] U.S. Cl. ......................................... 73/204; 73/118
[58] Field of Search ................... 73/204, 116, 118; 123/494; 338/296, 301, 302, 303, 304, 25, 28

[56] References Cited

U.S. PATENT DOCUMENTS

| | | | |
|---|---|---|---|
| 2,852,647 | 9/1958 | Charmichael | 338/302 |
| 3,677,085 | 7/1972 | Hayakawa | 73/204 |
| 4,011,756 | 3/1977 | Lemos | 338/28 X |
| 4,025,891 | 5/1977 | Fletcher et al. | 338/28 |

FOREIGN PATENT DOCUMENTS 54-145166  11/1979  Japan ..................................... 73/204

Primary Examiner—Herbert Goldstein
Attorney, Agent, or Firm—Antonelli, Terry & Wands

[57] ABSTRACT

An air flow rate sensor including a resistor the characteristic of which depends on temperature for operation mounted in a suction conduit of an internal combustion engine. The air flow rate sensor includes a tube of inorganic material, a platinum wire wound in convolutions on the surface of the tube, and a glass coating applied at least to the surface of the resistor while allowing a part of the surface to be exposed. The glass coating has a thickness smaller than the diameter of the resistor wire and enables equalization of pulsations of the sensor output to be obtained because of the thermal capacity of the glass coating.

7 Claims, 9 Drawing Figures

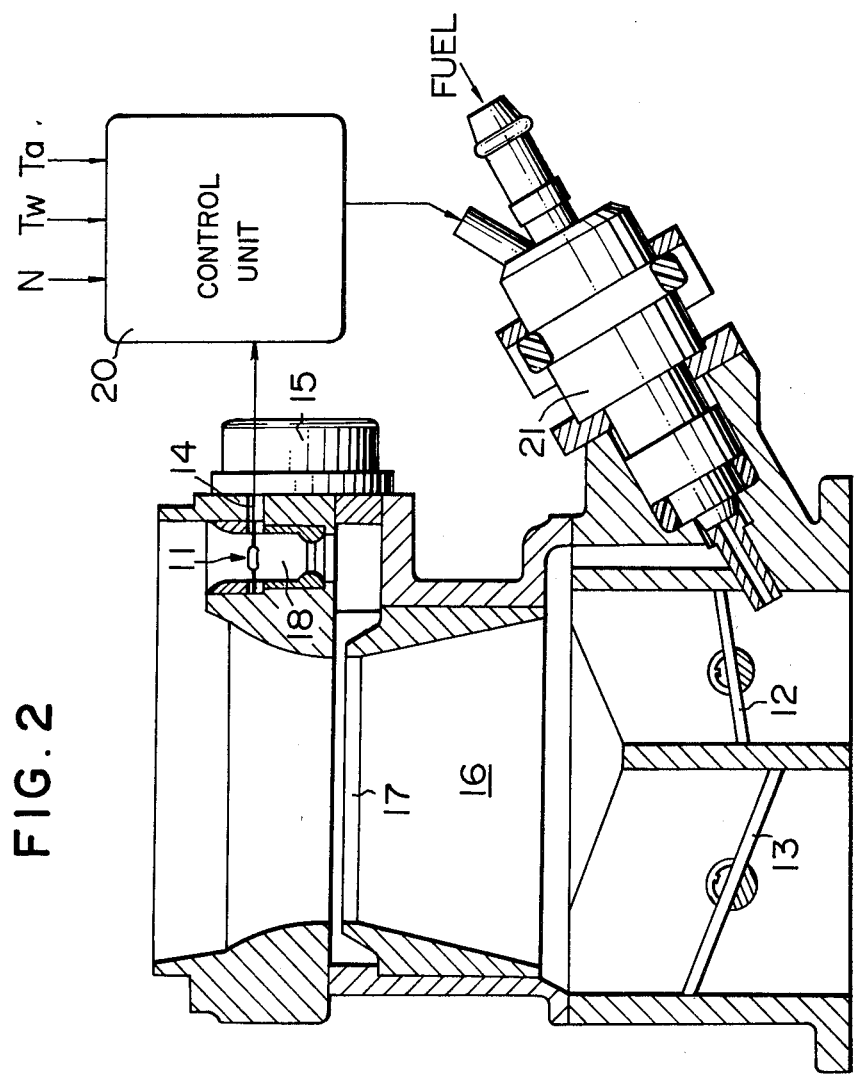

AIR INTAKE MEASURING DEVICE FOR INTERNAL COMBUSTION ENGINE

BACKGROUND OF THE INVENTION

This invention relates to air intake measuring devices for internal combustion engines, and more particularly it is concerned with a device for measuring an air flow rate comprising a resistor the characteristics of which depend on temperature which resistor is mounted in a suction conduit of an internal combustion engine for measuring the flow rate of air by use of the variations in amount of heat carried away by the air intake from the resistor as the resistor is caused to generate heat.

One example of devices for measuring an air intake for internal combustion engine is disclosed in U.S. Pat. No. 3,824,966 which uses a bare platinum wire as an air flow rate sensor element mounted in a main suction conduit. It is usual practice to use a fine platinum wire of about 0.05 mm in diameter to increase the accuracy with which the flow rate of air is measured. The finer the platinum wire, the higher becomes the accuracy with which the air intake can be measured. However, when the platinum wire used is too fine, the platinum wire is susceptible to influences exerted by backfires from the internal combustion engine, so that the platinum wire might be elongated and changes might be caused to occur in the resistance value. In worst cases, a break-out of the platinum wire might result.

Air intake of an internal combustion engine has pulsations, so that the output signal of a device for measuring the flow rate of air shows corresponding changes. It is not necessary for an air intake measuring device for an internal combustion engine to obtain an instant value of the flow rate of air, and it is rather preferred that the amount of air drawn into the engine in one suction stroke be accurately measured.

To this end, it has hitherto been customary to integrate a signal wave form produced by a measuring device over a predetermined period of time. However, this practice has suffered such disadvantage that the signal processing circuit becomes complex, making it difficult to obtain results at high speed.

SUMMARY OF THE INVENTION

This invention has been developed for the purpose of obviating the aforesaid disadvantages of the prior art. Accordingly, one object of the invention is to provide an air intake measuring device for an internal combustion engine which can equalize output signals without showing pulsating variation while keeping high responsiveness demanded in the case of this type of device.

Another object is to provide an air intake measuring device for an internal combustion engine capable of preventing changes that might otherwise occur in the resistor due to mechanical and thermal impacts of backfires and deposition of dust in the air intake on the resistor.

The outstanding characteristic of the invention is that the heating resistor has at least a part of its surface exposed while the rest of the surface is uniformly covered with a coating of inorganic material, without using a protective coating which has hitherto been applied to the entire surface of the heating resistor in the prior art. More specifically, when the heating resistor such as a platinum wire is wound on a fine tube formed of inorganic material such as alumina, the substantial portion of the surface of the platinum wire is coated with a signal equalizing material of inorganic material such as glass, while 5 to 50% of the surface thereof is exposed.

BRIEF DESCRIPTION OF THE DRAWINGS

FIG. 2 is a sectional view of the air intake measuring sensor element shown in FIG. 1 as mounted in a suction conduit of an internal combustion engine;

DESCRIPTION OF THE PREFERRED EMBODIMENT

Figure 1:
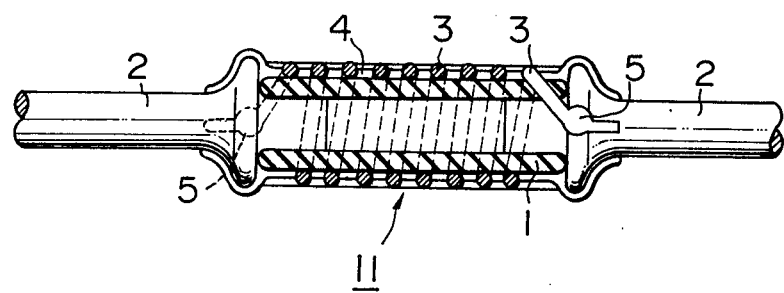
FIG. 1 is a sectional view of the air intake measuring sensor element comprising one embodiment of the invention.

In FIG. 1, a tube 1 formed of alumina has lead terminals 2 formed of platinum-iridium alloy wire fired and secured thereto by using a platinum base paste. A platinum wire 3 of about 0.02 mm in diameter is wound on the alumina tube 1 with convolutions being spaced apart from one another by an interval of about 0.035 mm. The numeral 4 designates a signal equalizing member in the form of a lead glass coating. The platinum wire 3 is joined by spot welding to the lead terminals 2 at points S, and the glass coating 4 is applied to a part of the lead terminals 2, to provide a sensor element 11.

FIG. 2 shows the sensor element 11 shown in FIG. 1 as mounted in a throttle chamber of a suction system of an automotive vehicle engine. In the figure, an outlet lead 14 extends from the sensor element 11 mounted in a bypass passage 18 to connect the sensor element 11 to a drive circuit module 15. The numeral 16 designates a main suction conduit provided with a venturi 17.

When the engine operates, a current of air intake is produced in the main suction conduit 16 depending on the opening of throttle valves 12 and 13, and a part of the current of air intake flows through the bypass passage 18, so that the sensor element 11 mounted in the bypass passage 18 generates an electric signal which may vary in value depending on the flow rate of air.

The electric output of the sensor element 11 is supplied to a control unit 20 after being amplified at the module 15, to be used with an engine rotation signal N, a cooling water temperature signal Tw and an atmospheric temperature signal To obtained by known means for producing an injection pulse signal to be supplied to an injector 21.

When the sensor element 11 mounted in the suction system as shown in FIG. 2 is too highly responsive, the output of the sensor element 11 has pulsations due to pulsations of the air intake occurring in the suction system. Generally, the period of the pulsations becomes very shorter than the sampling period of introducing an air flow rate signal to control unit 20 which sampling period is set at about 10 msec in view of the transitory response of the engine. It is presumed that this is caused by the air current changing in the vicinity of the sensor element 11 from a laminar flow to a turbulent flow, in addition to the pulsations of air intake in its flow to the engine.

The output signal of the sensor element 11 is not in linear proportion to the actual air volume. They are related to each other on the order of a biquadratic root. Thus a large error would be produced in measuring the actual air flow rate if the output signal is simply integrated. It would, therefore, be necessary to effect integration after the fourth power of the output signal of the sensor element 11 is obtained. This would render the signal processing circuit complex.

Attempts were made to investigate into the characteristic of the sensor element 11 with regard to the responsiveness and signal equalization, by providing the glass coating 4 on the convolutions of platinum wire 3 would on the alumina tube 1. In the tests, four different specimens were made by varying the thickness of the glass coating 4 to be 0.3, 0.5, 0.8 and 1.2 times as large as the diameter "d" of the platinum wire 3.

FIGS. 3A-3D are sectional views of the four different specimens, respectively, that have the thickness of the glass coating 4 varied as described hereinabove. The sensor element 11 used in the tests had the following measurements: the alumina tube 1 had an outer diameter of 0.5 mm, an inner diameter of 0.3 mm and a length of 20 mm, and the platinum wire 3 had a diameter of 0.02 mm was wound on the alumina tube 1 in convolutions spaced apart from one another by an interval of 0.035 mm.

Figure 3A:
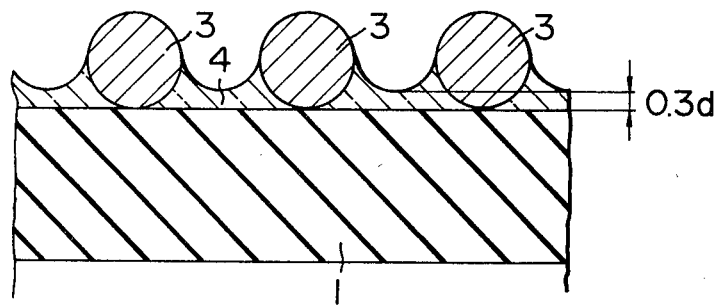
FIGS. 3A-3D are fragmentary sectional views of the air intake measuring sensor element having the signal equalizing member of varying thicknesses.

In a specimen shown in FIG. 3A in which the thickness of the glass coating 4 is 0.3 times the diameter d of the platinum wire 3, about 50% of the outer surface of the platinum wire 3 was covered with the glass coating 4 due to the surface tension of the molten glass. Results of tests conducted on this specimen show that satisfactory smoothing of the wave form of pulsations of the output signal is unobtainable with respect to pulsations occurring when the engine operates at low engine speed with full open throttle valve. However, it has been ascertained that this specimen can be put to practical use if a slight reduction in accuracy is tolerated under such special engine operating conditions.

Figure 3B:
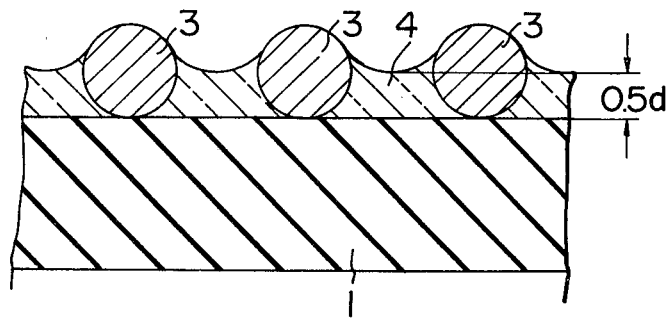

In a specimen shown in FIG. 3B in which the thickness of the glass coating 4 is 0.5 times the diameter d of the platinum wire 3, about 70% of the outer surface of the platinum wire 3 was covered with the glass coating 4, equalization of signals has been obtained in tolerable degree with respect to pulsations substantially over the entire operating range of the engine.

Figure 3C:
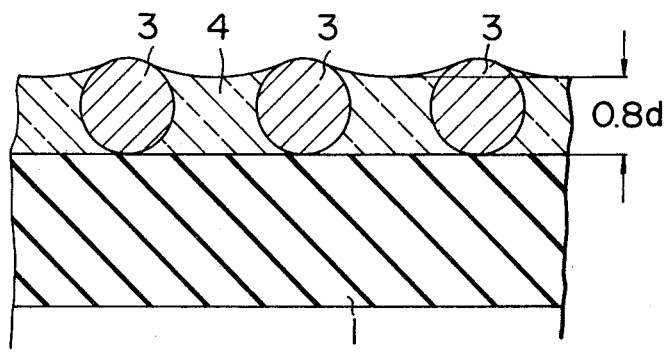
Figure 3D:
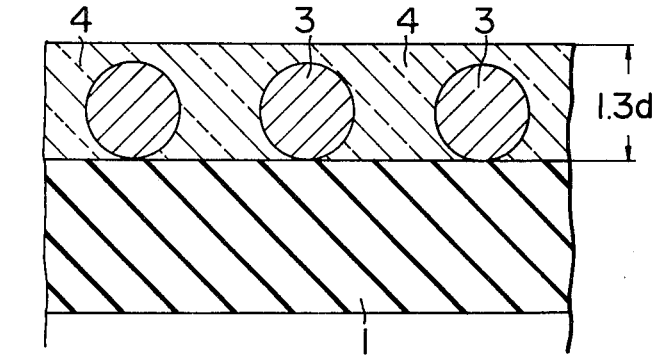

Specimens shown in FIGS. 3C and 3D have been found to achieve better results in obtaining equalization of signals with respect to pulsations. However, the specimen shown in FIG. 3D has been found to have a problem with regard to responsiveness.

From the results obtained in the tests referred to hereinabove, it has been concluded that exposure of not less than 5% of the outer surface of the platinum wire 3 is preferable, that is, the thickness of the glass coating 4 should be preferably not more than 0.8 times the diameter d of the platinum wire 3 to obtain the aforesaid desired degree of exposure of the surface of the platinum wire 3.

Adjustments of the thickness of the glass coating 4 may be effected by regulating the viscosity of molten glass in which the alumina tube 1 having the convolutions of the platinum wire 3 wound thereon is immersed to apply the glass coating 4 on the platinum wire 3. The volume of the molten glass adhering to the surface of the platinum wire may vary depending on the viscosity of the molten glass. When it is desired to reduce the thickness of the glass coating 4, one has only to raise the temperature of the molten glass.

Figure 4:
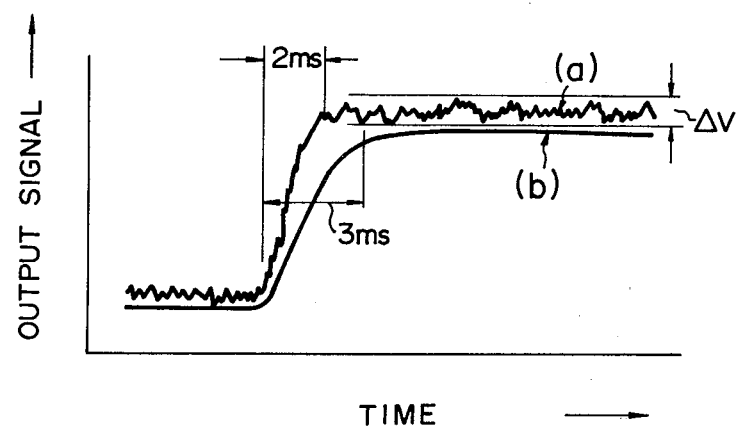
FIGS. 4 and 5 are graphs showing the responsiveness characteristic of the air intake measuring sensor element.
Figure 5:
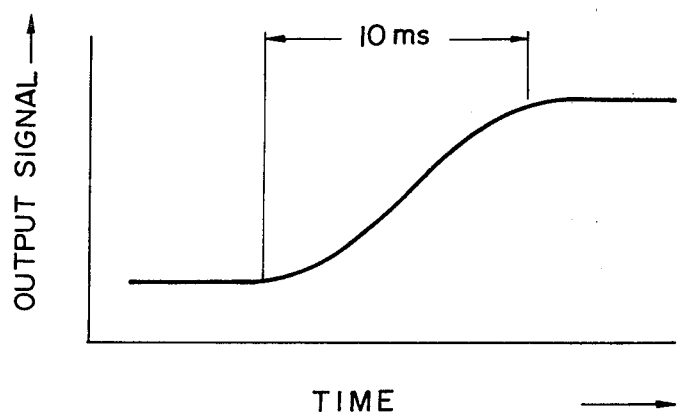

The diagrams shown in FIGS. 4 and 5 show typical step-response wave forms of the output signal of the air flow rate sensing device of a constant temperature difference hot-wire type according to the embodiment shown and described hereinabove. In the diagram of FIG. 4, a curve (b) represents the wave form obtained with th specimen shown in FIG. 3B, and a curve (a) represents the wave form obtained with a bare metal wire (tungsten wire with a diameter of 0.005 mm). The wave form represented by the curve (b) shows a delay which is the composite of a delay caused by the support and a delay caused by the signal equalizing member. The delay has superposed thereon a response characteristic of the closed loop gain of the drive circuit. The diagram of FIG. 5 shows the step-response wave form obtained with the specimen shown in FIG. 3D to show the dependency of the thickness of the signal equalizing member. It will be seen that the wave form corresponding to FIG. 3B is more suitable than other wave forms when used as a control signal for the fuel supply system.

The curve (a) shown in FIG. 4 has a characteristic such that the output voltage has maximum pulsations $\Delta V$ even after the flow rate of air intake has changed in stepwise fashion. If the actual flow rate of air intake is to be determined based on the signal showing such pulsations, there would be the need to use a signal processing circuit of complex construction.

The curve shown in FIG. 5 has a characteristic which is almost satisfactory merely in the point of equalizing signals. However, the characteristic of the curve shown in FIG. 5 in respect of a delay in response to the stepwise changes in the flow rate of air is about 10 msec which is over three times as great as the characteristic of the curve (b) shown in FIG. 4. This delay in response would be too great for a device for sensing the flow rate of air drawn into an internal combustion engine. The maximum delay in response to the stepwise changes in the flow rate of air intake that can be tolerated would be 5 msec, so that the operability of the internal combustion engine may not be interferred with during its transitory operating conditions. In view of this, the platinum wire 3 should not be wholly embedded in the glass coating 4 as is the case with the specimen shown in FIG. 3D.

Figure 6:
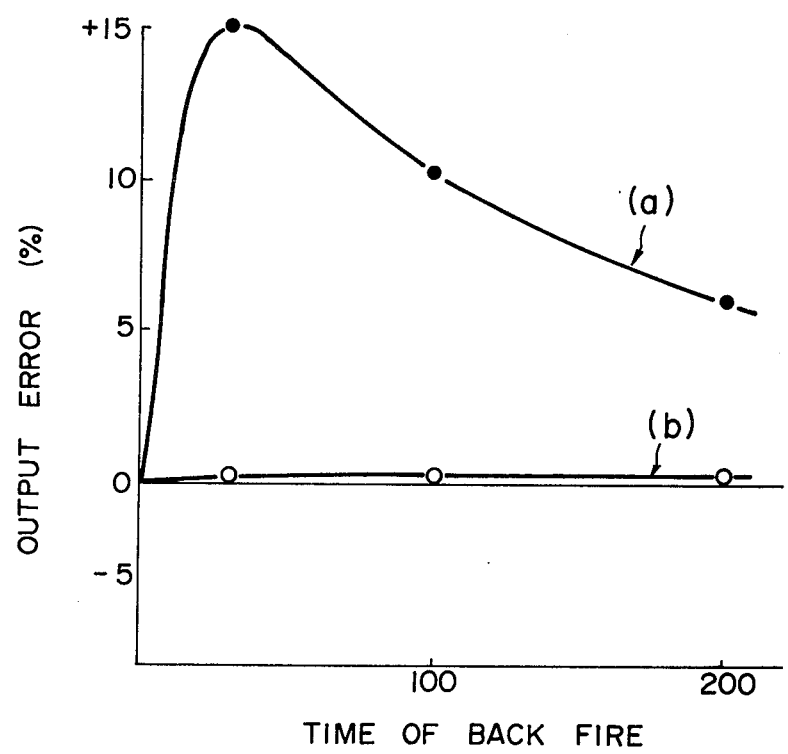
FIG. 6 is a graph showing the characteristics of the air intake measuring sensor element in which sensing error varies with repeated backfires.

FIG. 6 shows the results of tests conducted on the influences exerted by backfires on the operation of a flow rate sensor including a bare wire as shown in U.S. Pat. No. 3,834,966 and a sensor element of the wound type shown in FIG. 1 mounted in a suction conduit. A curve (a) shown in FIG. 6 represents the characteristic of the bare wire mounted in loop form in a main suction conduit which has produced errors of a maximum of 15% at the 40th backfire. It is assumed that the bare wire underwent permanent deformation due to backfires, causing changes to occur in the resistance value. Errors in sensing show a reduction after the 41st backfire. This would seem to indicate that the flow rate of air is seemingly reduced due to a reduction in the conductivity of heat from the bare wire to the air intake which reduction is caused by deposition of carbon on the surface of the bare wire due to backfires. This would represent that this error occurs in a direction opposite to that of the error due to the variation of the resistance value of the bare wire caused by the backfires. That is, if no deformation of the bare wire would have caused an error of about 10% in a minus direction.

Meanwhile the curve (b) of FIG. 6 represents the characteristic of the sensor element 11 shown in FIG. 1 which is arranged as shown in FIG. 2, its output error being so small with regard to 200 times of backfires that the error is negligible. This would appear to be accounted for by the facts that the sensor element 11 is not mounted in the main suction conduit but is mounted in the bypass conduit, that deformation of the sensor element 11 caused by backfires is small in magnitude, and that deposition of carbon on the surface of the sensor element 11 has no great influence because of the presence on the surface of the platinum wire 3 of the glass coating 4 having substantially the same heat conductivity as carbon.

The invention has been shown and described hereinabove by referring to an embodiment in which a platinum wire is used as a resistor wire depending for its operation on temperature and a glass coating is used as a signal equalizing member. It is to be understood, however, that the invention is not limited to this specific form of the invention shown and described hereinabove and that any metal wire other than the platinum wire that shows variations in resistance depending on temperature may be used as a resistor wire and any insulating material having a heat resisting property may be used for applying a coating, regardless of whether such material is organic or inorganic.

What is claimed is:

1. An air intake measuring device of a fuel supply system of an internal combustion engine for supplying a fuel of an amount commensurate with the flow rate of air drawn into the internal combustion engine, comprising:

an air flow rate sensor element, such air flow rate sensor element comprising:

a support formed of a ceramic electric insulating material;

a platinum resistor wire, the characteristic of which depends on temperature, wound on said support in convolutions;

and a signal equalizing member formed of lead glass uniformly applied as a coating on only a portion of the surface of said resistor wire in such a manner that a part of the surface of the resistor wire is exposed, while the rest thereof is covered with the coating of the signal equalizing member, said signal equalizing member rigidly securing the resistor wire to said support.

2. An air intake measuring device as claimed in claim 1, wherein said support comprises a tubular member having lead terminals secured thereto.

3. An air intake measuring device as claimed in claim 2, wherein said signal equalizing member is applied as a coating that covers at least electrical connections between the resistor wire and the lead terminals.

4. An air intake measuring device as claimed in claim 3, wherein said resistor wire convolutions have a predetermined spacing interval between the lead terminals secured to opposite ends of the support.

5. An air intake measuring device as claimed in claim 1, wherein said signal equalizing member is applied as a coating allowing at least 5% of the surface area of the resistor wire to be exposed.

6. An air intake measuring device as in claim 5, wherein the thickness of the equalizing member is not more than 0.8 times the diameter of the resistor wire.

7. An air intake measuring device according to claim 6, wherein the thickness of the equalizing member is at least 0.5 times the diameter of the resistor wire.

* * * * *